(12) United States Patent
Wong et al.

(10) Patent No.: US 7,769,247 B2
(45) Date of Patent: Aug. 3, 2010

(54) METHOD AND APPARATUS FOR DATA RE-ARRANGEMENT

(75) Inventors: Daniel Wong, Thornhill (CA); Henry Law, Scarborough (CA)

(73) Assignee: ATI Technologies ULC, Ontario (CA)

( * ) Notice: Subject to any disclaimer, the term of this patent is extended or adjusted under 35 U.S.C. 154(b) by 1043 days.

(21) Appl. No.: 10/448,717

(22) Filed: May 30, 2003

(65) Prior Publication Data

US 2004/0240755 A1 Dec. 2, 2004

(51) Int. Cl.
*G06K 9/32* (2006.01)
*G06K 9/36* (2006.01)
*G09G 5/00* (2006.01)
*H04N 9/74* (2006.01)

(52) U.S. Cl. .............. 382/293; 382/295; 382/296; 382/276; 345/619; 345/648; 345/672; 348/580; 348/583; 708/442; 708/208

(58) Field of Classification Search ............... 382/276, 382/293, 295, 395, 296
See application file for complete search history.

(56) References Cited

U.S. PATENT DOCUMENTS

| | | | | |
|---|---|---|---|---|
| 4,672,680 A | * | 6/1987 | Middleton | 382/295 |
| 5,499,324 A | * | 3/1996 | Nakayama | 345/610 |
| 5,555,321 A | * | 9/1996 | Ogura et al. | 382/235 |
| 6,149,520 A | * | 11/2000 | Takatsuka | 463/4 |
| 7,391,909 B2 | * | 6/2008 | Watson | 382/232 |
| 2003/0077000 A1 | * | 4/2003 | Blinn et al. | 382/260 |

* cited by examiner

*Primary Examiner*—Anand Bhatnagar
*Assistant Examiner*—Randolph Chu
(74) *Attorney, Agent, or Firm*—Vedder Price, P.C.

(57) ABSTRACT

A method and method and apparatus for data re-arrangement includes the steps of receiving output pixel coordinates (X, Y) and obtaining an input pixel offset value ($\Delta S$, $\Delta T$), wherein the output pixel coordinate represents a location for a two dimensional matrix. The input pixel offset value is obtained in reference to initial input pixel coordinates (S, T) which may be received with the output pixel coordinates or calculated based on the input and/or output pixel coordinates. The input pixel offset value may be any type of representation that provides for a delta value, for example, ($\Delta S$, $\Delta T$) may represent a shift representation for the offset within a matrix array. The method and apparatus for data re-arrangement further includes retrieving an input pixel based on the initial input pixel coordinates and the offset value.

26 Claims, 5 Drawing Sheets

FIG. 8

| | 802 | 806 | |
|---|---|---|---|
| 0 | 1 | 2 | 3 |
| 810 4 | 5 | 6 | 7 |
| 8 | 9 | 10 | 11 |
| 12 | 13 | 14 | 15 |

| 902 | 904 | | 108 |
|---|---|---|---|
| 0 | 1 | 5 | 6 |
| 2 | 4 | 7 | 12 |
| 3 | 8 | 11 | 13 |
| 9 | 10 | 14 | 15 |

| 1002 | 1004 | | |
|---|---|---|---|
| (0, 0) | (0, 0) | (-1, 1) | (-1, 1) |
| (2, -1) | (-1, 0) | (1, 0) | (-3, 2) |
| (3, -2) | (-1, 0) | (1, 0) | (-2, 1) |
| (1, -1) | (1, -1) | (0, 0) | (0, 0) |

1000

METHOD AND APPARATUS FOR DATA RE-ARRANGEMENT

FIELD OF THE INVENTION

The present invention relates generally to graphics processing and more specifically to graphics data re-arrangement.

BACKGROUND OF THE INVENTION

In a typical graphics processing system, graphics data may be provided to a shader. The graphics data may be computed using various graphics processing techniques and thereupon provided to the shader, wherein the shader performs shading operations in accordance with known shading techniques.

In some graphics processing systems, the shader may be an application specific integrated circuit (ASIC), which requires the graphics data to be within a specific format prior to shading. FIG. 1 illustrates a prior art processing system 100 for providing graphics data to a shader 102. A processor 104, such as an ASIC, receives a plurality of input pixels 106 from a pixel input 108. In one embodiment, the pixel input 108 may be a memory device, such as, but not limited to, a single memory, a plurality of memory locations, shared memory, CD, DVD, ROM, RAM, EEPROM, optical storage, microcode, or any other non-volatile storage medium. In another embodiment, the pixel input 108 may represent one or more busses within a pipeline for data processing.

The processor 104 thereupon performs a functional operation on the input pixels 106 to generate the output pixels 110, which are provided to a pixel output 112. In one embodiment, the pixel output 112 may be a memory device, such as, but not limited to, a single memory, a plurality of memory locations, shared memory, CD, DVD, ROM, RAM, EEPROM, optical storage, microcode, or any other non-volatile storage medium. In another embodiment, the pixel output 112 may represent one or more busses within a pipeline for data processing.

In accordance with known graphics processing techniques, the shader 102 may thereupon perform shading operations on the graphics data and provides an output object (not shown) to a display or other graphics processing system.

The system 100 of FIG. 1 contains inefficiencies. For example, the processor 104 has limited bandwidth for transferring the input pixels 106 from the pixel input 108 to the pixel output 112. In one embodiment, the input pixels 106 may be arranged in a linear fashion wherein the pixel output 112 requires the pixels within a matrix array format for the graphics shader 102. For example, the input pixels 106 may be linear due to encoded or compression requirements which need to be reformatted by the processor 104.

As recognized by one having ordinary skill in the art, a central processing unit (not illustrated) may be utilized to provide an input of data to the pixel input 108. Re-arrangement of this data may be desired prior to output by the pixel output 112. The processor 104 is capable of handling large data transfers, but typically the processor 104 is required to perform data re-arrangement on a pixel by pixel basis, which provides for an extremely inefficient system. One proposed solution is the off-loading of this data re-arrangement processing to a central processing unit. Although, this solution provides other inefficiencies due to the usage of CPU cycles for performing these operations. Another proposed solution is to create a large number of small primitives for the graphics pipeline to carry out the data, movement. Although, due to the small amount of data in each transfer, overhead inefficiencies are very noticeable in a processing system.

Therefore, there exists a need for a method and apparatus for performing data re-arrangement for arranging graphics data for performing shading operations.

BRIEF DESCRIPTION OF THE DRAWINGS

FIG. 8 illustrates a matrix representation of a pixel input array;

FIG. 9 illustrates a matrix representation of a pixel output array; and

FIG. 10 illustrates a matrix array of a plurality of offset values for producing the matrix array of FIG. 9 from the matrix array of FIG. 8, in accordance with one embodiment of the present invention.

DETAILED DESCRIPTION OF A PREFERRED EMBODIMENT

Generally, a method and apparatus for data re-arrangement includes the steps of receiving output pixel coordinates and obtaining an input pixel offset value. In one embodiment, an output pixel coordinate may be any type of representation, such as an array, of a location. For example, an output pixel coordinate may be a coordinate having a particular location within a predefined range, such as (X, Y) coordinate for a two dimensional matrix. The input pixel offset value may be any type of representation, such as represented in input pixel format, that provides for a delta value, for example, ($\Delta S$, $\Delta T$) may represent a shift representation for the offset within a matrix array. The method and apparatus for data re-arrangement further includes retrieving an input pixel based on initial input pixel coordinates and the input pixel offset value, ($S+\Delta S$, $T+\Delta T$), wherein the initial input pixel coordinates ($S,T$) may be received in conjunction with output pixel coordinates or described based on the output pixel coordinates. In one embodiment, an input pixel may be retrieved from a memory device or other data pipeline, such as a plurality of busses, wherein the input pixel is a data representation of a particular pixel to be provided to a shader program for the application of a shading technique such that the input pixel, in conjunction with a plurality of other pixels, may be, in one embodiment, provided to an output display.

Figure 1:
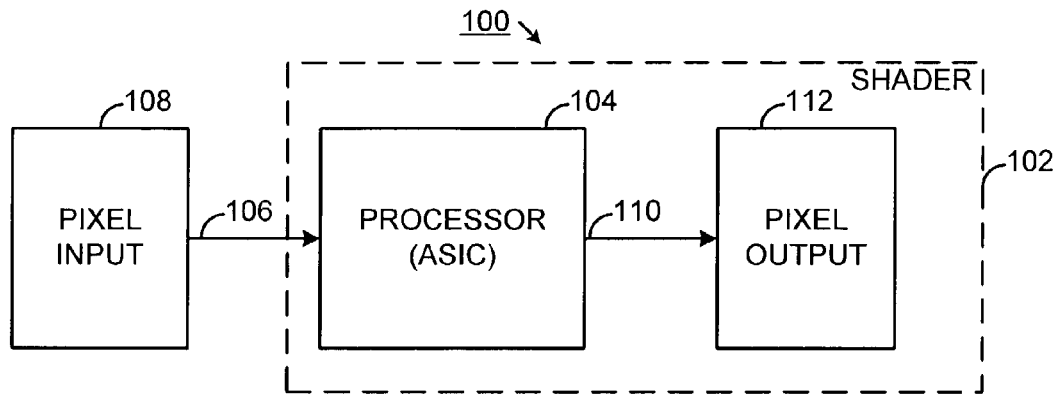
FIG. 1 illustrates a schematic block diagram of a prior art graphics data processing unit.
Figure 2:
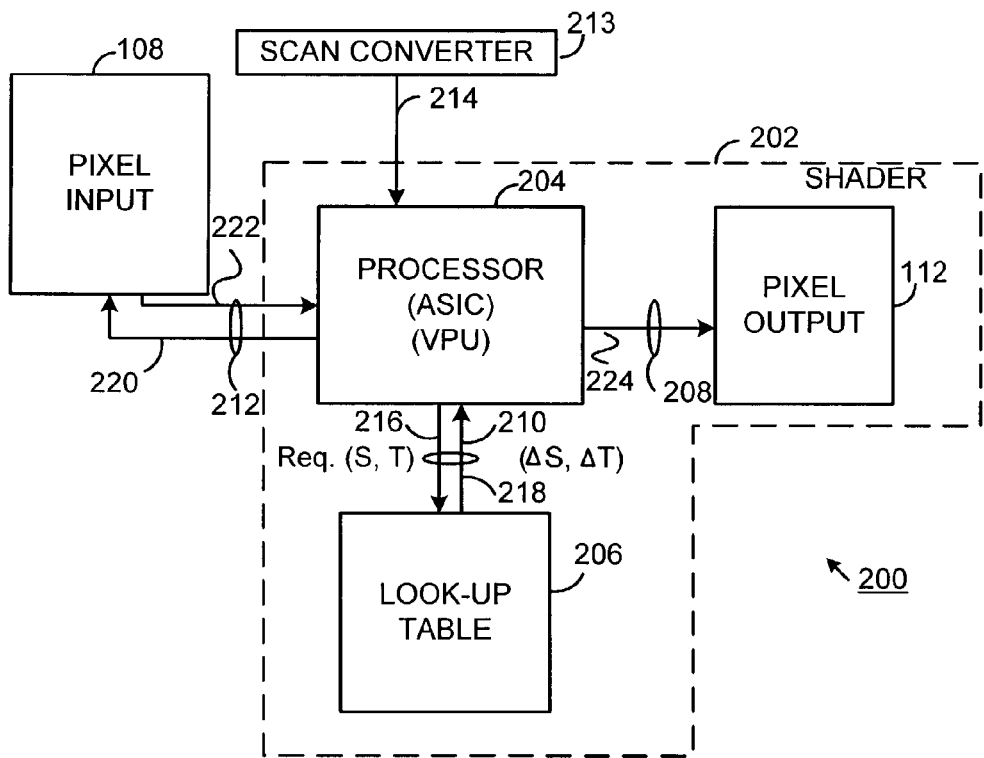
FIG. 2 illustrates a schematic block diagram of an apparatus for data re-arrangement in accordance with one embodiment of the present invention.

More specifically, FIG. 2 illustrates the processing system 200 having a shader 202 coupled to the memory storing the pixel input 108. The shader 202 includes the memory storing the pixel output 112, a processor 204 and a lookup table 206.

In one embodiment, the processor 204 may be, but not limited to, a single processor, a plurality of processors, a DSP, a microprocessor, an ASIC, a state machine, a visual processing unit (VPU) or any other implementation capable of processing and executing software or discrete logic or any other suitable combination of hardware, software and/or firmware. The term processor should not be constructed to refer exclusively to hardware capable of executing software, and may implicitly include DSP hardware, ROM for storing software, RAM, and any other volatile or non-volatile storage medium. Moreover, the lookup table 206 and the pixel input 108 and pixel output 112 may be, but not limited to, a single memory, a plurality of memory locations, shared memory, cache, CD, DVD, ROM, RAM, EEPROM, optical storage or any other non-volatile storage medium capable of storing digital data.

The processor 204 is coupled to the pixel output 112 via a first bus 208, coupled to the memory 206 (e.g., lookup table) via a second bus 210 and coupled to the pixel input 108 via a third bus 212. As recognized by one having ordinary skill in the art, the busses 208, 210 and 212 may be any type of suitable bi-directional bus providing for the operable coupling of the components thereto and the ability to transfer data thereacross. Moreover, the processor 204 is coupled to a scan converter 213.

In accordance with one embodiment of the resent invention, the scan converter 213 provides a pixel location 214, such as an (X, Y) coordinate, to the processor 204 across the bus 208. The processor 204, in response to executable instructions, thereupon derives initial input pixel coordinates (S, T) and the (X, Y) coordinate. For example, a predetermined conversion may be utilized, such as S=X mod 4 and T=Y mod 4, wherein if the pixel location 214 is (10, 10), the initial input pixel coordinates (S, T) would be calculated to be (2, 2). The processor 204 generates a location request 216, REQ (S, T), to the lookup table 206 across bus 210. The lookup table 206 thereupon generates an input pixel offset value 218, which is provided back to the processor 204 across the bus 210.

Using the input pixel offset value, such as ($\Delta S$, $\Delta T$), combined with the pixel location 214, the processor 204 thereupon provides an input pixel request 220 to the pixel input 108 across bus 212. In one embodiment, the processor 204 will be programmed with a different equation in generating request 220. For example, if S=X+$\Delta S$ and T=Y+$\Delta T$, then input pixel request 220 would be calculated to be (X+$\Delta S$, Y+$\Delta T$). Using the input pixel request 220, (S=X+$\Delta S$, T=Y+$\Delta T$), an input pixel 222 is retrieved from the pixel input 108 and provided back to the processor 204. The processor 204 thereupon provides a write command 224 to the pixel output 112, such that the input pixel 222 may be written to the output pixel location with the desired displacement.

In another embodiment, the shader 202 may be coupled to rendering engine, in accordance with known graphics rendering technology, wherein the rendering backend provides both the (X, Y) output pixel coordinates, and the (S, T) initial input pixel coordinates in 216 author 220. In the preferred embodiment, a determination may be made regarding whether the calculation of the (S, T) coordinates from the (X, Y) coordinates front the (X, Y) coordinates will require excessive processing overhead as compared with data transfer requirements and data transfer overhead limitations regarding the transfer of both (S, T) and (X, Y) coordinates to the processor 204.

In the embodiment wherein the (S, T) values are originally received by the processor 204, the (S, T) values are used to generate the request 216, combined with the input pixel offset values ($\Delta S$, $\Delta T$). In this embodiment, the received (S, T) may also include values to generate the input pixel request (S+$\Delta S$, T+$\Delta T$).

As a practical matter, as recognized by one having ordinary skill in the art, the processor 204 fetches the input pixel value 222 from the pixel input 108, wherein the input pixel value 222 is also quantified as an (S, T) value. For clarity purposes, the input pixel value 222 is utilized by the processor 204 as the value within the write command 224 and the initial input pixel coordinates are quantified as (S, T) values, whether generated by the processor 204 or received with the output pixel coordinates 214, are used for generating the input pixel request 220.

The above discussion relates to FIG. 2 with regards to a single pixel, wherein the shader 202 may repeat the process for each of the pixel locations within the pixel output 112. Therefore, once all the input pixels have been retrieved for each of the output pixel locations, 214, the pixel output 112 contains data for a full frame display. Wherein, by using the processor 204 in conjunction with a lookup table 206 and the pixel input 108 and pixel output 112, shader operations may be performed locally within the shader 202, offloading precious CPU processing cycles and allowing for improved and efficient shader operations.

Figure 3:
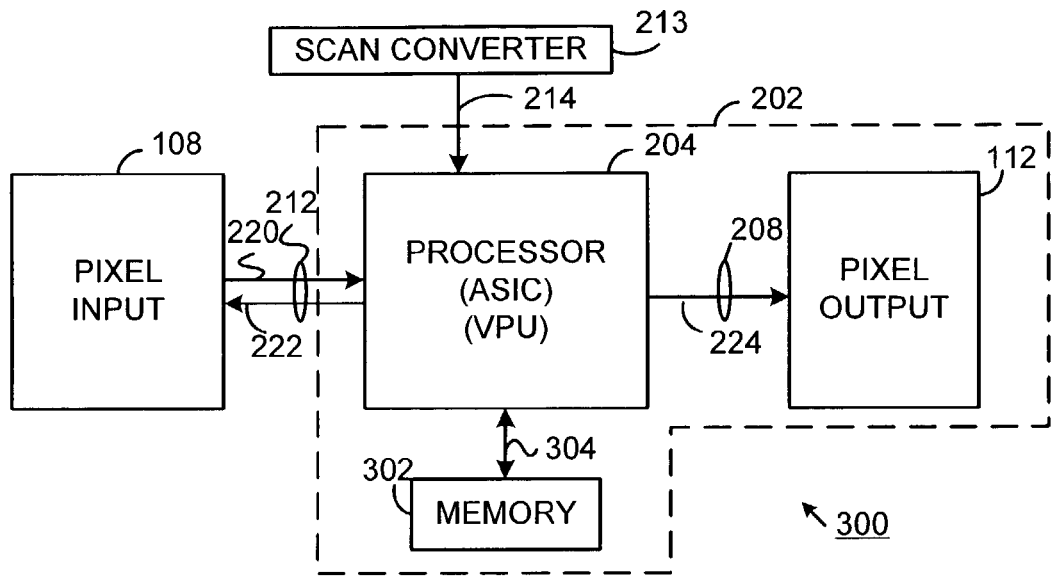
FIG. 3 illustrates another embodiment of the apparatus for data re-arrangement in accordance with one embodiment of the present invention.

FIG. 3 illustrates an alternative embodiment of the present invention having a system 300 with the shader 202 coupled to the pixel input 108. The shader 202 therein includes a memory 302 coupled to the processor 204 across a bidirectional bus 304. The memory 302 may contain executable instructions that may be provided to the processor 204 across bus 304 such that the processor may calculate the input pixel offset value on the fly, on a pixel by pixel basis. In an alternative embodiment, the memory 302 may contain a plurality of lookup tables such that a particular lookup table may be provided to the processor 204 for performing operations similar to those discussed above with regards to FIG. 2, with having a lookup table within an embedded memory (not shown) within the processor 204.

The system 300 of FIG. 3 allows for a wider variety of options with the processor 204 having the ability to utilize different lookup tables which may be disposed within the memory 302 or perform various calculations in a real time manner. The system 300 provides for pixel output 112 coupled via bus 208 to the processor 204 and the processor coupled to the pixel input 108 across bus 212. The scan conversion logic 213 provides the address location 214 such that the processor 204 may thereupon generate the input pixel request 220 in view of the initial input pixel coordinates and the internally generated input pixel offset value. The processor 204 thereupon receives the input pixel value 222 and provides the write command 224 to write the input pixel value to the pixel output 112 at the original location designated by pixel address 214.

Figure 4:
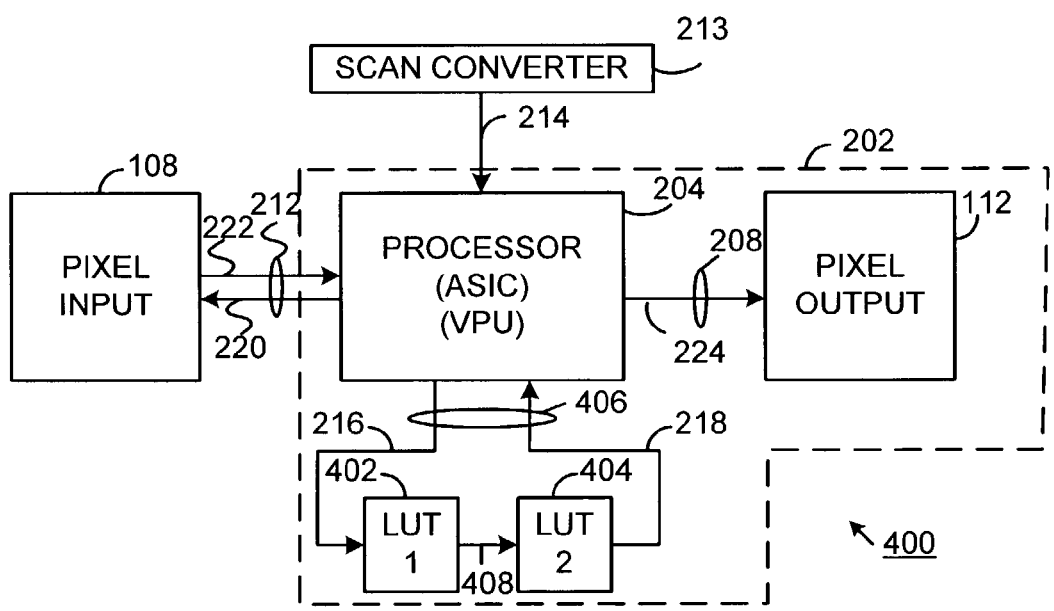
FIG. 4 illustrates a schematic block diagram of another embodiment of the apparatus for data re-arrangement in accordance with one embodiment of the present invention.

FIG. 4 illustrates another alternative embodiment of a system 400 for data re-arrangement. System 400 includes the pixel input 108 and the pixel output 112 coupled to the processor 204 via busses 212 and 208 respectively. The shader 202 further includes a first lookup table 402 and a second lookup table 404.

Similar to the operations of system 200 and 300 of FIGS. 2 and 3, a pixel location 214 is provided to the processor 204 which thereupon provides a pixel location request 216 to the first lookup table 402. In this embodiment, the first lookup table may provide an initial calculation value 408 which is provided to the second lookup table 404. The second lookup table 404 may use the input 408 and thereupon generate the input pixel offset value 218. The system 400, by utilizing multiple lookup tables 402 and 404, provides for a greater level of scalability and ability to improve the processing speed of complex operations by breaking them up into smaller operations via multiple lookup tables 402 and 404. Furthermore, as recognized by one having ordinary skill in the art, the lookup tables 402 and 404 may be programmed with various levels of data to provide for a greater degree of scalability in adjusting the generation of the input pixel offset value 218 in accordance with various requirements with the shader 202.

Once again, the processor 204, upon receiving the input pixel offset value 218, (ΔS, ΔT), provides the input pixel request 220, (S+ΔS, T+ΔT), to the pixel input 108. The input pixel 222, which as discussed above, max have undergone a complex displacement from the initial input pixel coordinates (S, T), is retrieved from the pixel input 108 and provided to the processor 204 across bus 212. The processor 204 thereupon writes the input pixel 224 to the pixel output 112 at the original pixel location.

Figure 5:
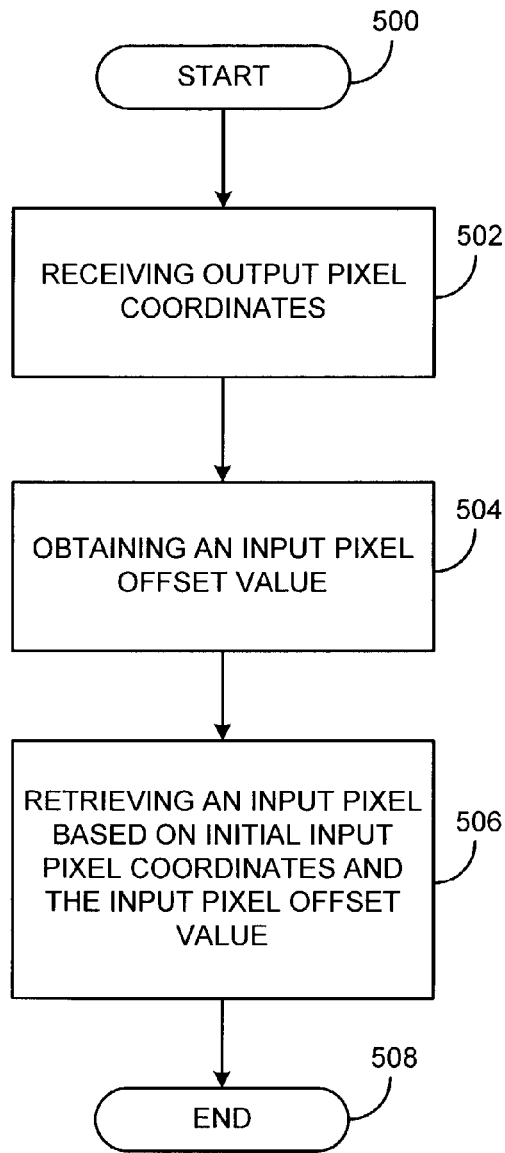
FIG. 5 illustrates a flow chart of a method for data re-arrangement in accordance with one embodiment of the present invention.

FIG. 5 illustrates the steps of a method for data re-arrangement in accordance with one embodiment of the present invention. The method begins, step 500, by receiving output pixel coordinates, step 502. As discussed above, one example of the output pixel coordinate is a (X, Y) coordinate for a two-dimensional matrix. Initial input pixel coordinates (S, T) may be received concurrently with the output pixel coordinates or may be generated based on the output pixel coordinates. The next step is obtaining an input pixel offset value, step 504, (ΔS, ΔT), based on the initial input pixel coordinates. In one embodiment, the input pixel offset value is obtained by accessing a lookup table having a corresponding input pixel offset value which is referenced by the initial input pixel coordinates. Moreover, in one embodiment, the input pixel offset value represents a shift representation for the offset within a matrix array.

The next step of the method, step 506, is retrieving an input pixel based on the initial input pixel coordinates and the input pixel offset value, (S+ΔS, T+ΔT). In one embodiment, the input pixel is retrieved from an input pixel matrix array utilizing the input pixel offset value and the initial input pixel coordinates. As such, an input pixel is provided based on the initial input pixel coordinates and input pixel offset value within a matrix array. Among other things, the method improves over the previous techniques by allowing for a reverse processing of pixel coordinates starting with an output pixel location and based on an offset value in the pixel location to retrieve an input pixel as compared to previously providing an input pixel, performing a transformation, and thereupon disposing the input pixel in an output pixel location. As such, the method is complete, step 508.

Figure 6:
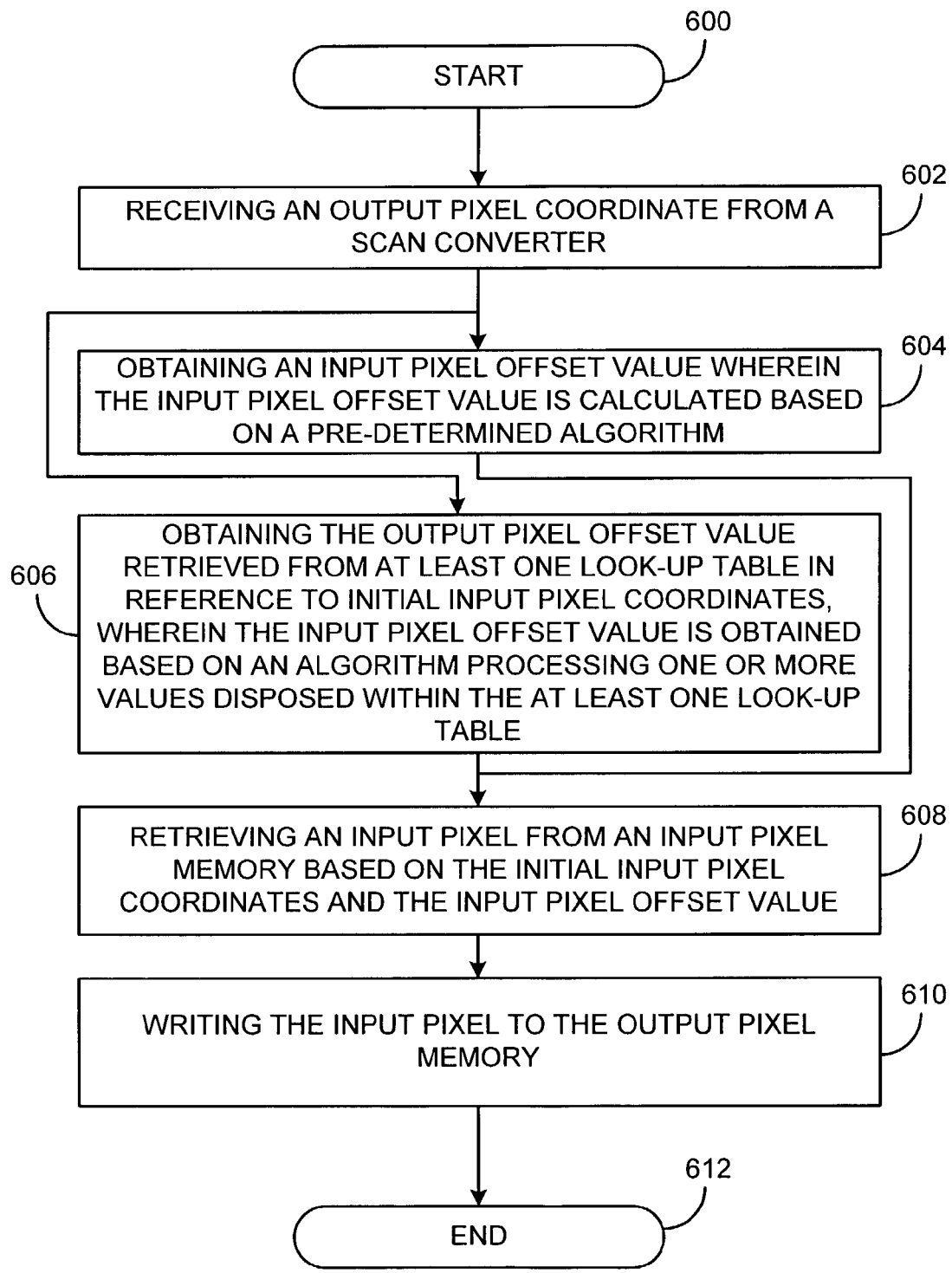
FIG. 6 illustrates a flow chart of an alternative embodiment of the method for data re-arrangement illustrated in FIG. 5.

FIG. 6 illustrates another embodiment of a method for data re-arrangement. The method begins, step 600, by receiving output pixel coordinates and initial input pixel coordinates from an output pixel memory, step 602. The next step is obtaining an input pixel offset value wherein the input pixel offset value is calculated based on a predetermined algorithm, step 604. In an alternative embodiment, instead of obtaining the input pixel offset value based on a predetermined algorithm, the input pixel offset value may be obtained by being retrieved from at least one lookup table referenced by th initial input pixel coordinates, wherein the input pixel offset value is obtained based on an algorithm processing one or more values disposed within the at least one lookup table, step 606. Similar to the embodiments discussed above with regards to FIGS. 2 and 4, one or more lookup tables (206, 402 and/or 404) may be utilized to obtain the input pixel offset value.

Once the input pixel offset value (ΔS, ΔT) is obtained, either via step 604 or step 606, the next step is retrieving an input pixel from an input pixel memory based on the combination of the initial input pixel coordinates and the input pixel offset value, step 608, (S+ΔS, T+ΔT). The next step is writing the input pixel to the output pixel memory, step 610, from wherein the output pixel coordinate was originally received in step 602 relative to the input pixel offset value. Thereupon, the method is complete, step 612.

Figure 7:
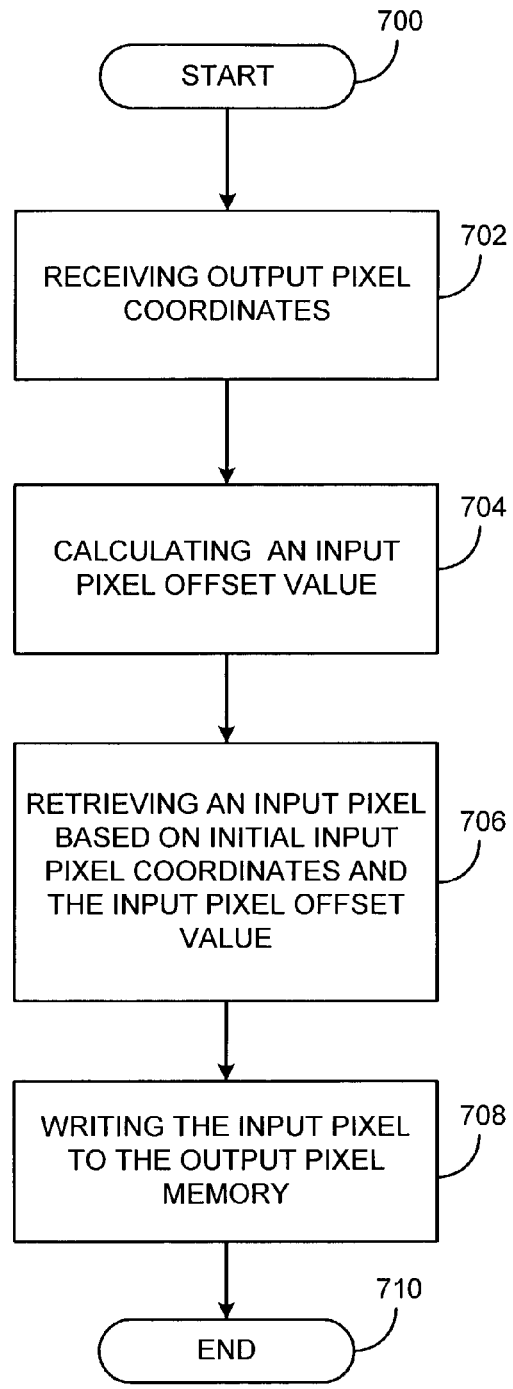
FIG. 7 illustrates a flow chart of a method for data re-arrangement in accordance with one embodiment of the present invention.

FIG. 7 illustrates an alternative embodiment of a method for data rearrangement, similar to the alternative system of FIG. 3. The method begins, step 700, by receiving output pixel coordinates, (X, Y), step 702. The next step, step 704, is calculating an input pixel offset value based on initial input pixel coordinates, wherein the initial input pixel coordinates (S, T) may be either received in conjunction with the output pixel coordinates or generated based on the output pixel coordinates. In one embodiment, the input pixel offset value may be calculated using the processor 204 in response to executable instructions 304 provided by the memory 302.

Once the input pixel offset value has been calculated, an input pixel is retrieved based on the initial input pixel coordinates and the input pixel offset value, (S+ΔS, T+ΔT), step 706. Similar to step 610 of FIG. 6, the next step is writing the input pixel to the output pixel memory, step 708. Thereupon, the method is complete, step 710.

FIGS. 8 and 9 illustrate a graphical representation of a matrix array of pixel data to illustrate one example of one embodiment of the present invention. FIG. 8 represents the input pixel matrix array 800 such as may be found in the memory 108, FIG. 9 illustrates one example of an output pixel matrix array 900 such as may be found in memory 112 and FIG. 10 represents a plurality of input pixel offset values 1000 in a matrix array that defines the displacement vectors as may be found within the lookup table 206. As recognized by one having ordinary skill in the art, matrix arrays 800 and 900 are illustrated in a 4×4 matrix array for illustrative purposes only but may contain larger arrays having any number of rows and columns as recognized by one having ordinary skill in the art. Furthermore, as recognized by one having ordinary skill in the art, the data within the matrix array may be serially disposed within a memory device or disposed across the plurality of memory locations.

Using the exemplary matrix arrays 800, 900 with respect to the embodiment described above in FIG. 2, plus the equations given in [0022] and [0023] as an example, to render pixel 13 in FIG. 9, processor 204 receives (3,2) as output pixel coordinates 214. Processor 204 is programmed to produce (3 mod 4, 2 mod 4)=(3, 2) as the initial input pixel coordinates 216 to access lookup table 206 (e.g., a displacement table) in FIG. 10. Processor 204 will receive (−2, 1) as the input pixel offset value 218 (e.g., a displacement vector). Processor 204 is also programmed to combine 214 and 218 to produce (3+−2, 2+1)=(1, 3) as the input pixel request 220 to access source pixel 13 in FIG. 8. At the end of the process, pixel 13 from FIG. 8 is copied to pixel 13 in FIG. 9.

In one embodiment, the method is continued for every address locatio in the matrix array 900 until all the addresses contain pixel data. When the described process is applied to all sixteen pixels, pixels in FIG. 8 are rearranged to the layout given in FIG. 9. The lookup table 1000 represents a four by four dezigzag matrix array. As recognized by one having ordinary skill in the art, other lookup tables with in the spirit and scope of the present invention.

It should be understood that there exist implementations of other variations and modifications of the invention and its various aspects, as may be readily apparent to those of ordinary skill in the art, and that the invention is not limited by the specific embodiments described herein. For example, the processor 204 may utilize a combination of a lookup table 206 and an internal calculation in response to executable instructions 304 to generate the input pixel offset value. It is therefore contemplated to cover, by the present invention, any and all modifications, variations, or equivalents to fall within the spirit and scope of the basic underlying principles disclosed and claimed herein.

What is claimed is:

1. A method for data re-arrangement using logic circuitry, comprising:
   receiving, with at least a first portion of the logic circuitry, output pixel coordinates;
   retrieving, with at least a second portion of the logic circuitry, an input pixel offset value;
   calculating, with at least a third portion of the logic circuitry, initial input pixel coordinates based on the output pixel coordinates in accordance with a displacement vector, wherein the output pixel coordinates correspond to a zigzag pixel arrangement of the input pixel coordinates in accordance with the displacement vector;
   retrieving, with at least a fourth portion of the logic circuitry, an input pixel based on the initial input pixel coordinates and the input pixel offset value, wherein the retrieved input pixel is rearranged in accordance with the input pixel offset value; and
   performing, with at least a fifth portion of the logic circuitry, at least one shading operation on the retrieved input pixel.

2. The method of claim 1 wherein obtaining an input pixel offset value includes:
   determining the initial input pixel coordinates from the output pixel coordinates; and
   calculating the input pixel offset value based on a pre-determined algorithm.

3. The method of claim 1 wherein obtaining the input pixel offset value includes:
   retrieving the input pixel offset value from at least one look-up table.

4. The method of claim 3 wherein the input pixel offset value is retrieved in reference to the initial input pixel coordinates.

5. The method of claim 3 wherein the input pixel offset value is obtained based on an algorithm processing one or more values retrieved from the least one look-up table.

6. The method of claim 1 further comprising:
   writing the input pixel to an output pixel memory.

7. The method of claim 1 wherein the output pixel coordinate is received from a scan converter and the input pixel is retrieved from an input pixel memory.

8. The method of claim 1 further comprising:
   prior to obtaining the input pixel offset value, receiving the initial input pixel coordinates.

9. A method for data re-arrangement using logic circuitry, comprising:
   receiving output pixel coordinates from a scan converter;
   calculating initial input pixel coordinates;
   calculating an input pixel offset value based on the initial input pixel coordinates;
   retrieving an input pixel from an input pixel memory based on the initial input pixel coordinates and the input pixel offset value, wherein the initial input pixel coordinates are based on the output pixel coordinates in accordance with a displacement vector, the output pixel coordinates correspond to a zigzag pixel arrangement of the input pixel coordinates in accordance with the displacement vector, and the input pixel is a data representation of a particular pixel to undergo a shading technique; and
   rearranging the input pixel by writing the input pixel to an output pixel memory at a location indicated by the output pixel coordinate and the input pixel offset value.

10. The method of claim 9 wherein the input pixel offset value is calculated based on a pre-determined algorithm.

11. The method of claim 10 wherein at least one value used to calculate the input pixel offset value is retrieved from at least one look-up table.

12. The method of claim 9 wherein the input pixel offset value is calculated using a graphics processing unit.

13. The method of claim 9 further comprising:
    prior to calculating the input pixel offset value, receiving the initial input pixel coordinates.

14. The method of claim 9 further comprising:
    prior to calculating the input pixel offset value, calculating the initial input pixel coordinates based on the output pixel coordinates.

15. An apparatus for data re-arrangement comprising:
    a shader comprising:
       a memory device capable of storing executable instructions; and
       a processor operably coupled to the memory device wherein the processor, in response to the executable instructions:
       receives an output pixel coordinate;
       obtains an input pixel offset value;
       calculates initial input pixel coordinates based on the output pixel coordinates in accordance with a displacement vector, wherein the output pixel coordinates correspond to a zigzag pixel arrangement of the input pixel coordinates in accordance with the displacement vector;
       retrieves an input pixel based on the initial input pixel coordinates and the input pixel offset value, wherein the retrieved input pixel is rearranged in accordance with the input pixel offset value; and
       performs at least one shading operation on the retrieved input pixel.

16. The apparatus of claim 15 wherein the processor, in response to the executable instructions:
    calculates the input pixel offset value based on a pre-determined algorithm.

17. The apparatus of claim 15 further comprising:
    at least one look-up table operably coupled to the processor, wherein the processor, in response to the executable instructions:
    retrieves the input pixel offset value from the at least one look-up table.

18. The apparatus of claim 17 wherein the input pixel offset value is retrieved in reference to the initial input pixel coordinates.

19. The apparatus of claim 17 wherein the input pixel offset value is obtained based on an algorithm for processing one or more values retrieved from the at least one look-up table.

20. The apparatus of claim 15 wherein the processor, in response to the executable instructions:
    writes the input pixel to an output pixel memory.

21. The apparatus of claim 15 further comprising:
    the output pixel memory operably coupled to the processor, wherein the output pixel memory stores the output pixel coordinates; and
    an input pixel memory operably coupled to the processor such that the processor, in response to the executable instructions, retrieves the input pixel from the input pixel memory.

22. The apparatus of claim 15 wherein the processor, in response to executable instructions:
   prior to obtaining the input pixel offset value, receives the initial input pixel coordinates.

23. The apparatus of claim 15 wherein the processor, in response to executable instructions:
   prior to obtaining the input pixel offset value, calculates the initial input pixel coordinates based on the output pixel coordinates.

24. An apparatus for data re-arrangement comprising:
   a shader comprising:
      a memory device capable of storing executable instructions; and
      a processor operably coupled to the memory device wherein the processor, in response to the executable instructions:
         receives output pixel coordinates from a scan converter;
         calculates an input pixel offset value;
         calculates initial input pixel coordinates based on the output pixel coordinates in accordance with a displacement vector, wherein the output pixel coordinates correspond to a zigzag pixel arrangement of the input pixel coordinates in accordance with the displacement vector;
         retrieves an input pixel based on the initial input pixel coordinates and the input pixel offset value, wherein the retrieved input pixel is rearranged in accordance with the input pixel offset value;
         writes the retrieved input pixel to an output pixel memory; and
         performs at least one shading operation on the retrieved input pixel.

25. The apparatus of claim 24 wherein the processor, in response to the executable instructions:
   calculates the input pixel offset value based on a pre-determined algorithm.

26. The apparatus of claim 24 further comprising:
   at least one look-up table operably coupled to the processor, wherein at least one value used to calculate the input pixel offset value is retrieved from the at least one look-up table.

* * * * *